(No Model.)
L. MOORTHAMERS.
DRY GALVANIC BATTERY.
No. 423,335. Patented Mar. 11, 1890.
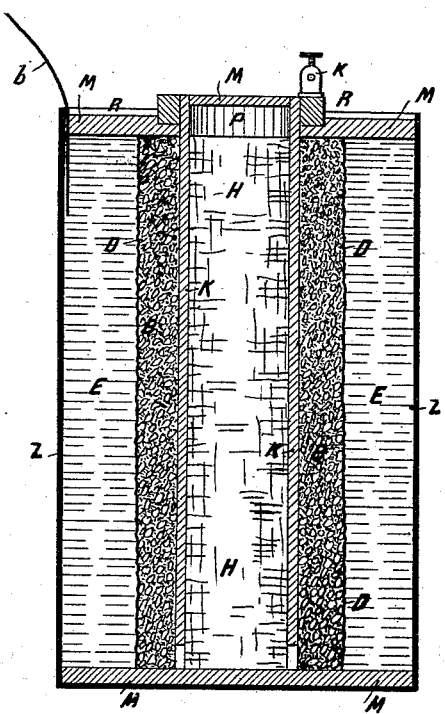
Attest
E. Arthur
Edward P. Knight
Inventor
Louis Moorthamers.
By Knight Bros.
Attys

UNITED STATES PATENT OFFICE.

LOUIS MOORTHAMERS, OF BRUSSELS, BELGIUM.

DRY GALVANIC BATTERY.

SPECIFICATION forming part of Letters Patent No. 423,335, dated March 11, 1890.

Application filed May 21, 1889. Serial No. 311,562. (No model.) Patented in Belgium August 11, 1888, No. 82,878; in France December 6, 1888, No. 194,612, and in Germany December 8, 1888, No. 48,695.

*To all whom it may concern:*

Be it known that I, LOUIS MOORTHAMERS, manufacturer, a subject of the King of Belgium, and a resident of Brussels, in the Kingdom of Belgium, have invented new and useful Improvements in Dry Electric Batteries, (for which I have obtained Letters Patent of Belgium, No. 82,878, August 11, 1888; France, No. 194,612, December 6, 1888, and Germany, No. 48,695, December 8, 1888,) of which the following is a specification.

This invention relates to the production of a dry electric battery in which on the one hand the plastic exciting medium is composed of such substances as will cause the degree of humidity thereof to remain constant during the entire existence of the element, and on the other hand an arrangement is provided whereby the ammoniacal vapors given off by the decomposition are absorbed as they are generated, so that they are prevented from coming in contact with the electrodes, and consequently polarization of the element is entirely avoided.

The arrangement of the battery is shown on the accompanying drawing. It is constructed as follows: An outer vessel Z, of zinc, closed at bottom and open at top and amalgamated on its side walls, while its bottom is coated with mineral wax M, is filled to a certain extent with the plastic exciting medium E, which consists of a saturated solution of ammonium chloride in water, which is rendered of the necessary consistency by admixture of chalk and hydrochlorate of lime, these two substances serving to absorb moisture, and consequently to retain the same in the exciting medium, instead of allowing the same to evaporate through the diaphragm and carbon, so that there will not occur any drying up of the mass, such as takes place in other dry batteries. If the diaphragm D is immersed in this solution, the latter will rise in the zinc vessel to a corresponding height, surrounding the diaphragm.

For diminishing the internal resistance of the element, the diaphragm is formed of a linen bag, into which is introduced a hollow cylinder K of retort-carbon. This is open at its lower end and is entirely surrounded by a mixture B of pulverized retort-carbon and pieces of pyrolusite, which hold the cylinder upright in the diaphragm and wedge the same tight therein. Toward its upper end the carbon cylinder is coated with paraffine, after having been provided at its upper edge with a metal ring R. The internal space of this cylinder is entirely filled by a core of wood-charcoal H, which, as is well-known, possesses considerable powers of absorption, and which is intended to take up the ammonia-vapors that are liberated while the battery is in operation, so that no polarization of the element can take place. The element thus constructed is hermetically inclosed at top by first introducing into the upper opening of the carbon cylinder a flat cork bung P, and then pouring over the same, as also over the whole of the top of the battery-pile—that is, over the pulverized carbon, the diaphragm, and the exciting medium—a thick layer of mineral wax M. The pole-connections are then made in the usual manner by soldering a copper plate $b$ to the zinc vessel and fixing a terminal screw $k$ to the metal ring of the carbon cylinder.

I claim—

1. An electric dry battery having an exciting-paste composed of ammonium chloride, chalk, and hydrochlorate of lime.

2. In an electric dry battery, the combination of zinc cup Z, containing a mixture of ammonium chloride with chalk and hydrochlorate of lime as the exciting-paste, with the hollow carbon cylinder K, containing a vapor-absorbing agent, substantially as herein set forth.

3. In an electric dry battery, the combination of zinc cup Z, exciting-paste E, of ammonium chloride, chalk, and hydrochlorate of lime, with diaphragm B of crushed carbon, hollow carbon cylinder K, and core of wood-charcoal H for absorbing the freed ammonia-vapors and preventing polarization, as herein set forth.

LOUIS MOORTHAMERS.

Witnesses:
   AUG. YOERISSEN,
   C. MAILLIEN.